Aug 5, 1941. G. G. CARLSON 2,251,324
COMBINED ASSEMBLING PRESS AND WELDING MACHINE
Filed April 12, 1939 10 Sheets-Sheet 8
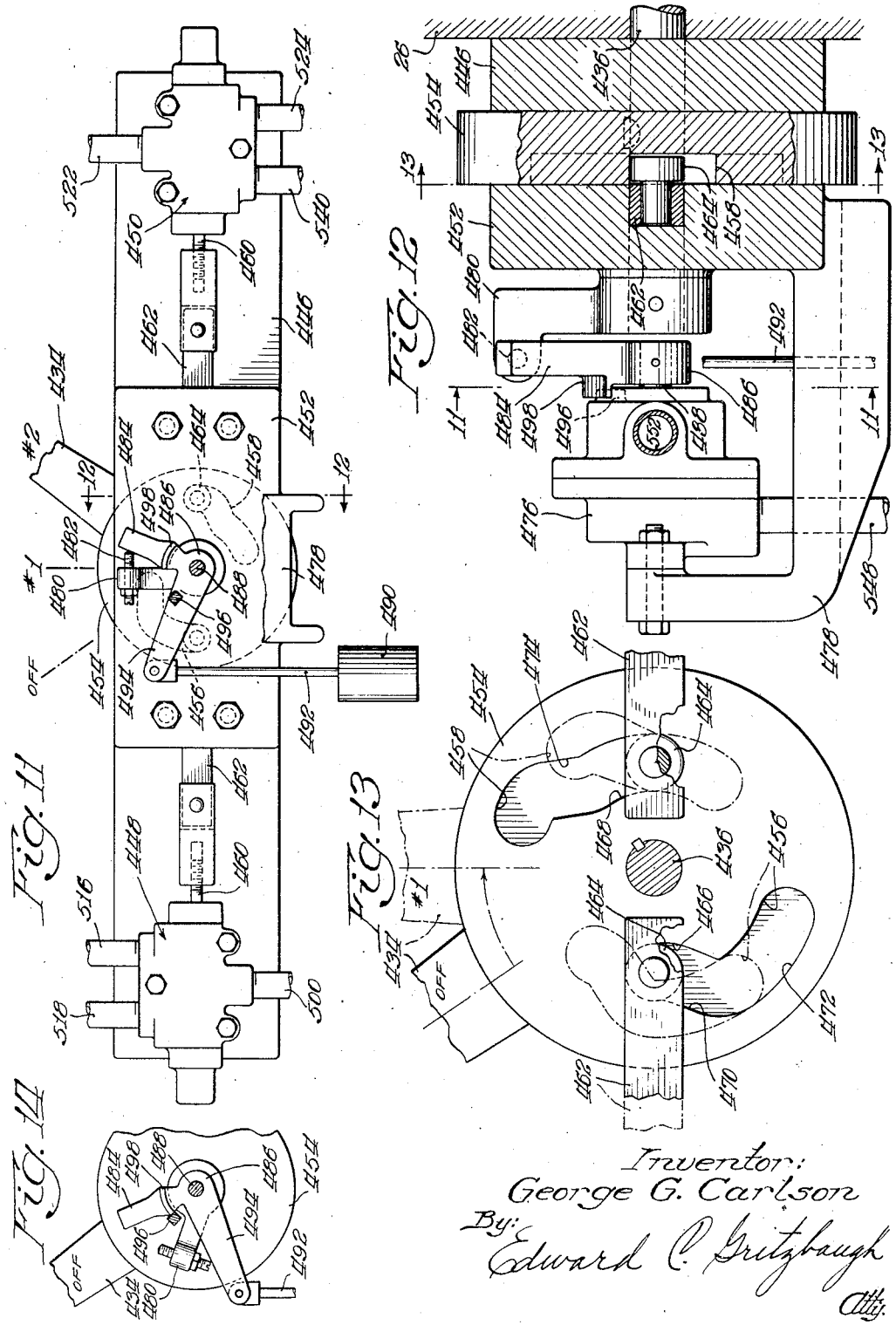
Inventor:
George G. Carlson
By: Edward C. Gritzbaugh
Atty.

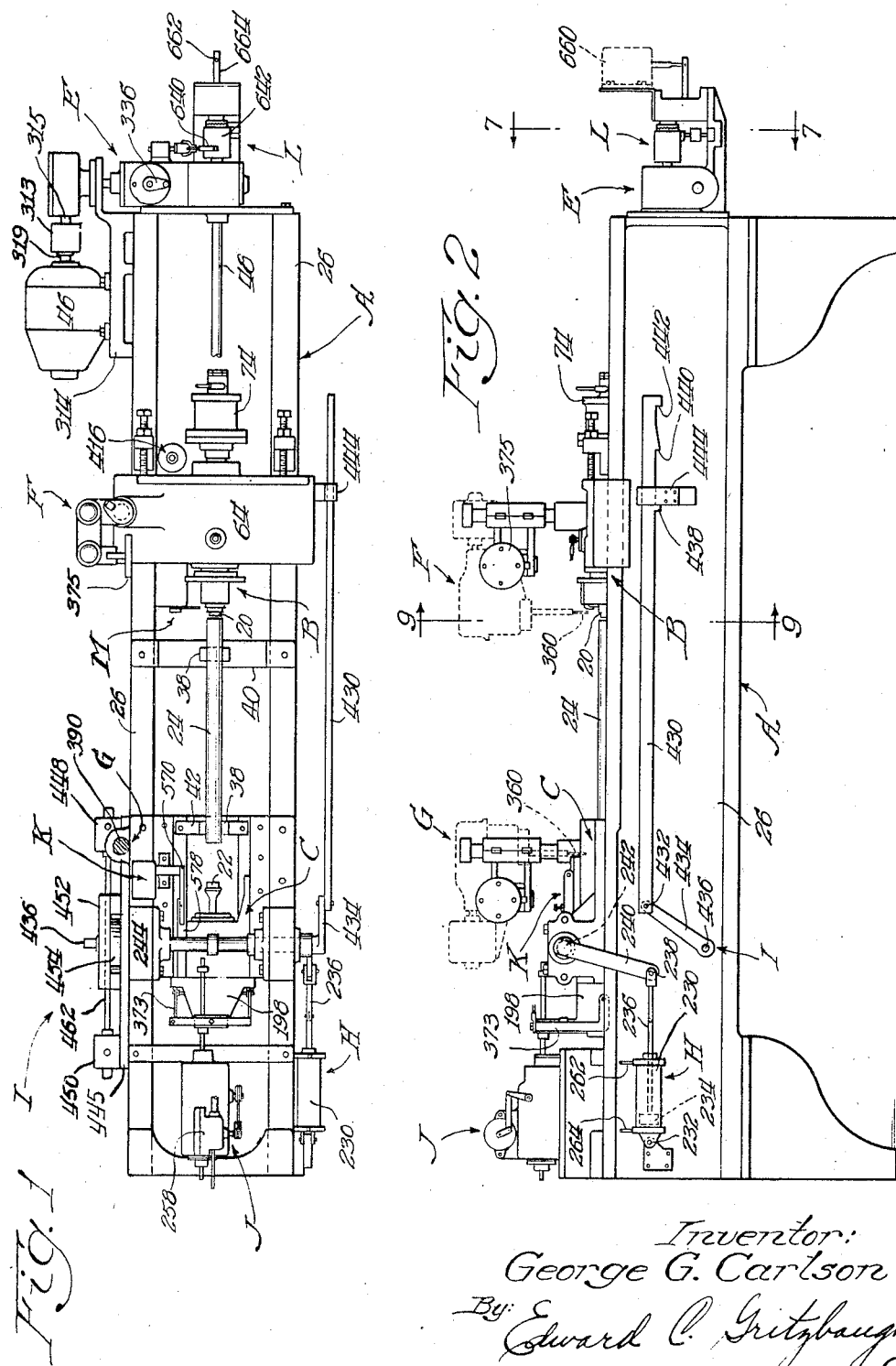

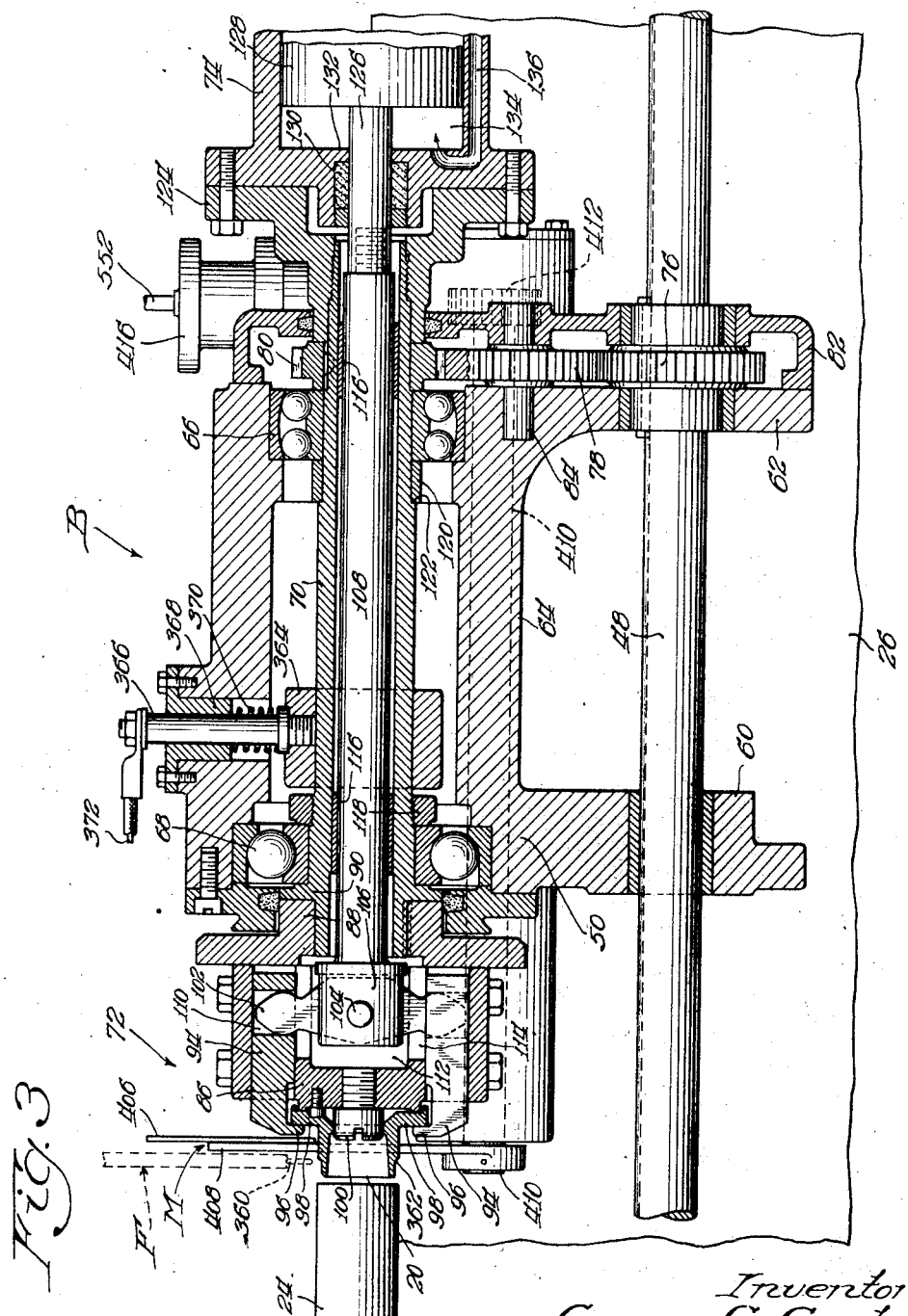

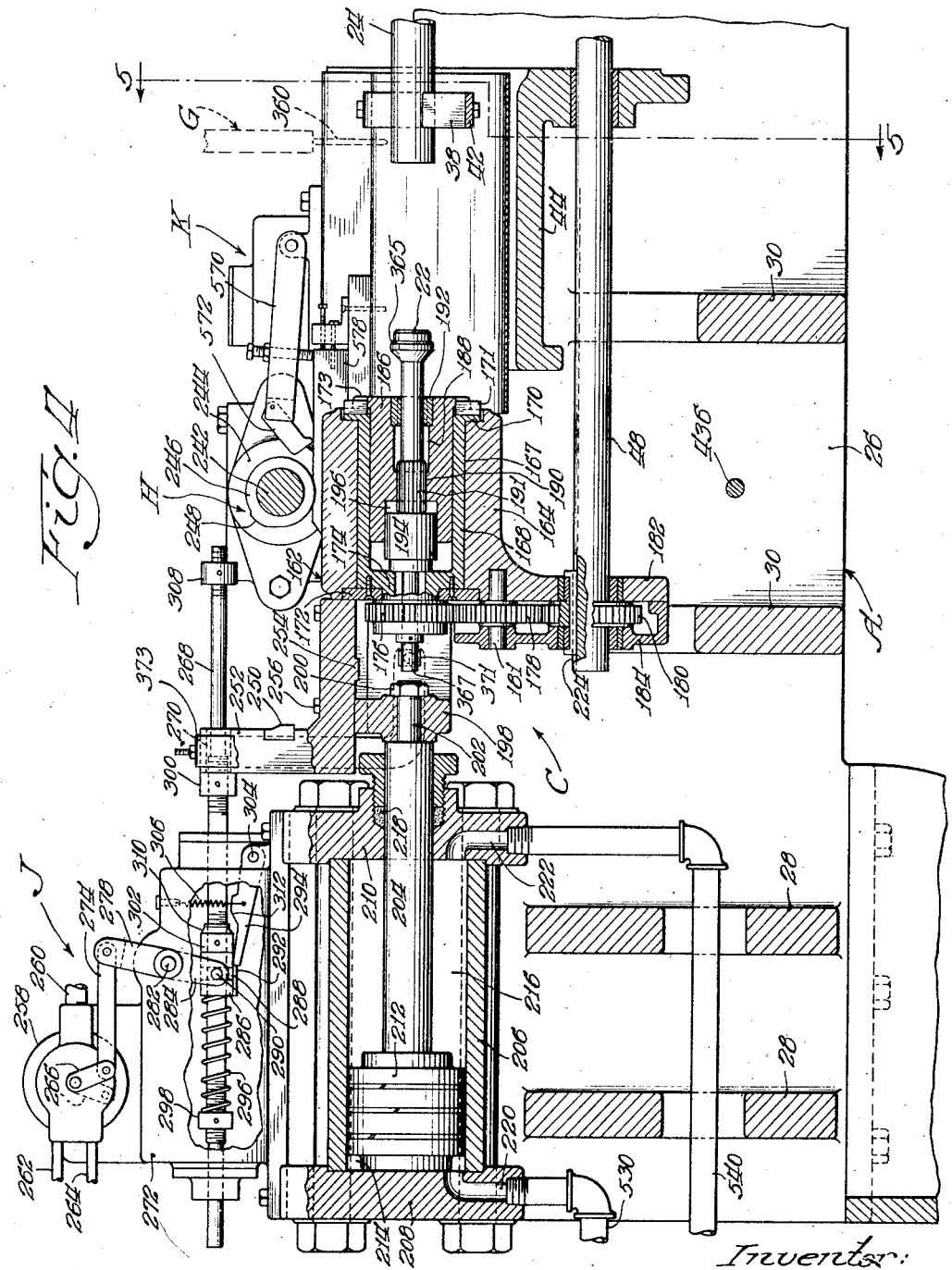

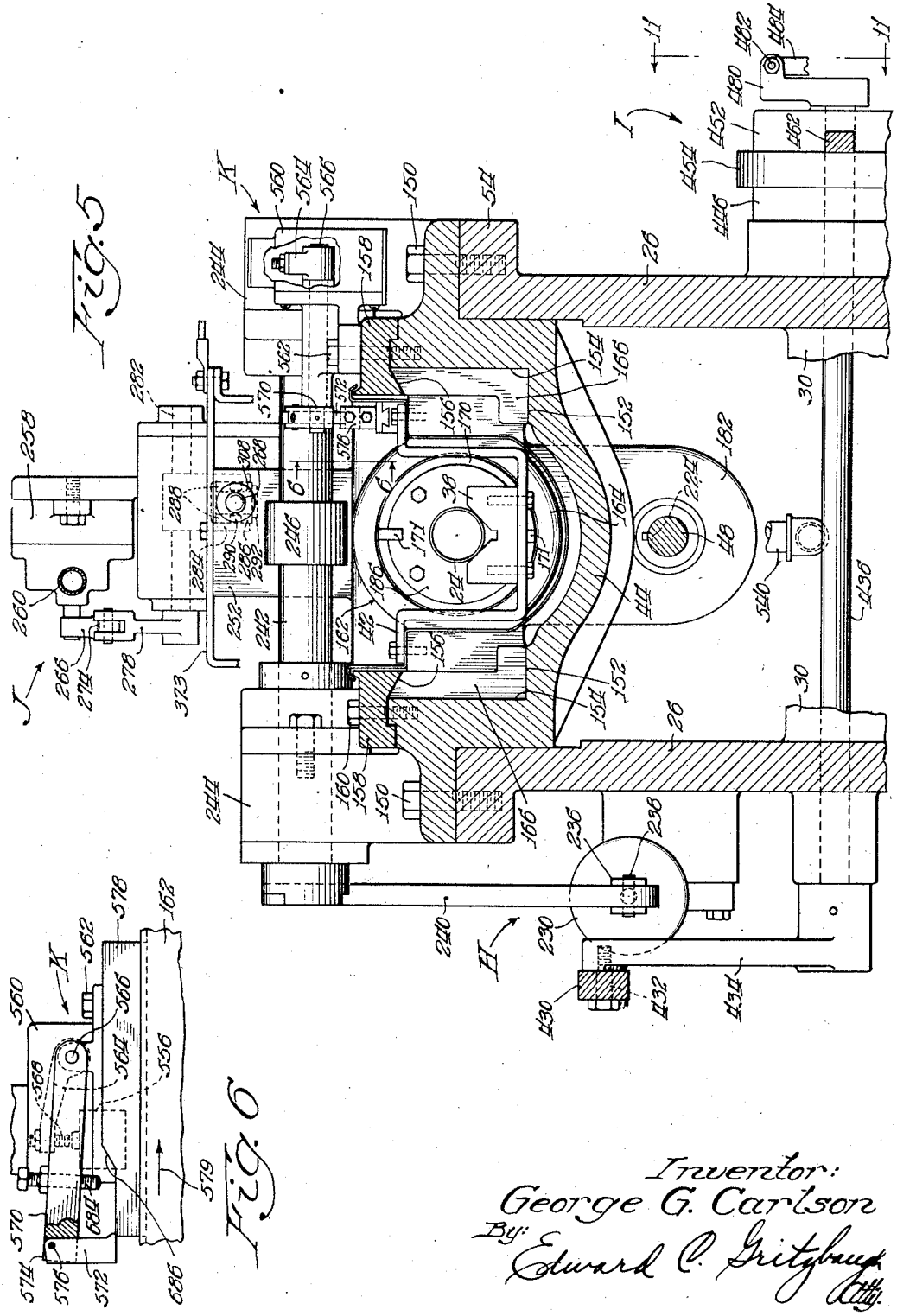

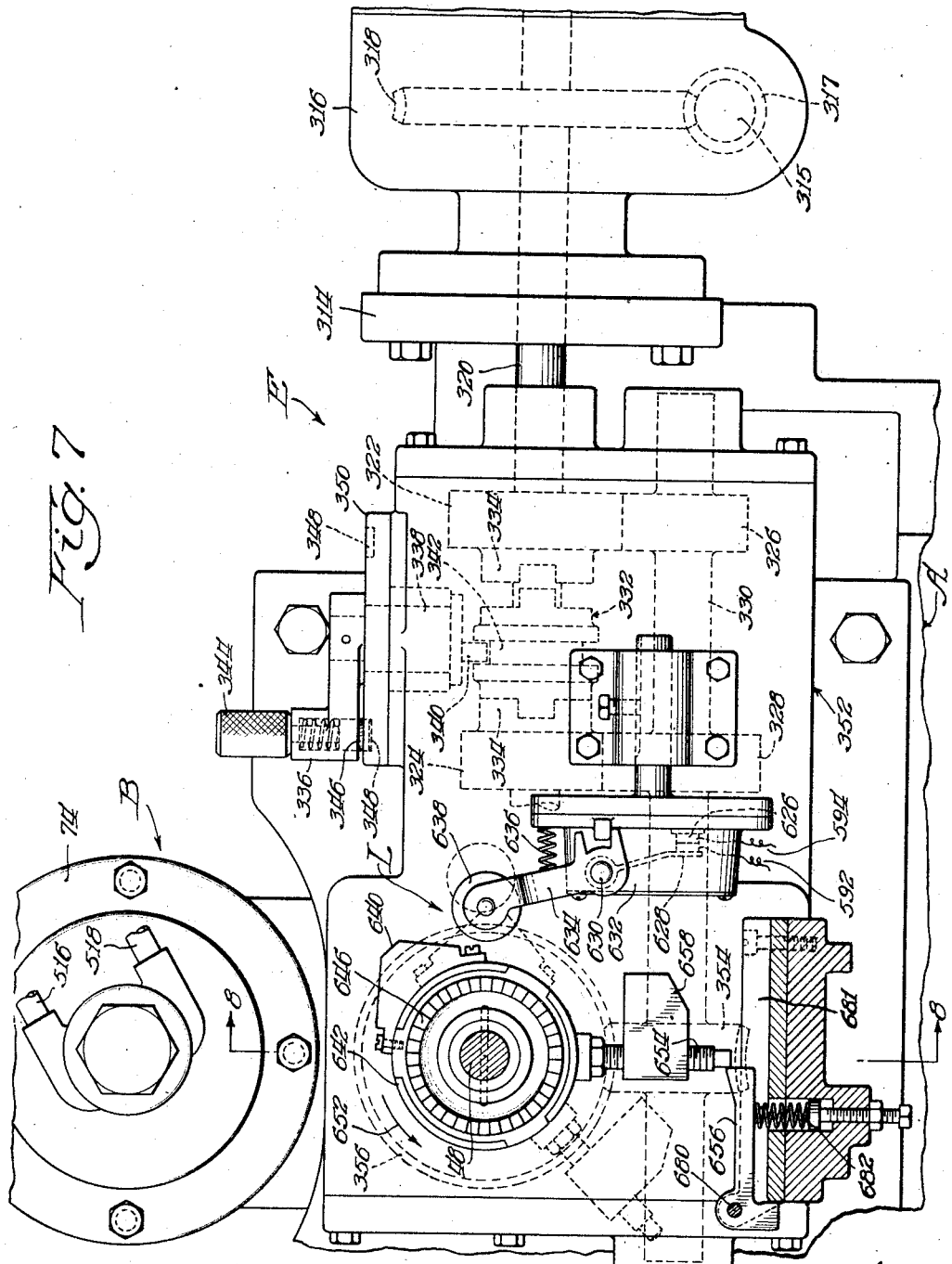

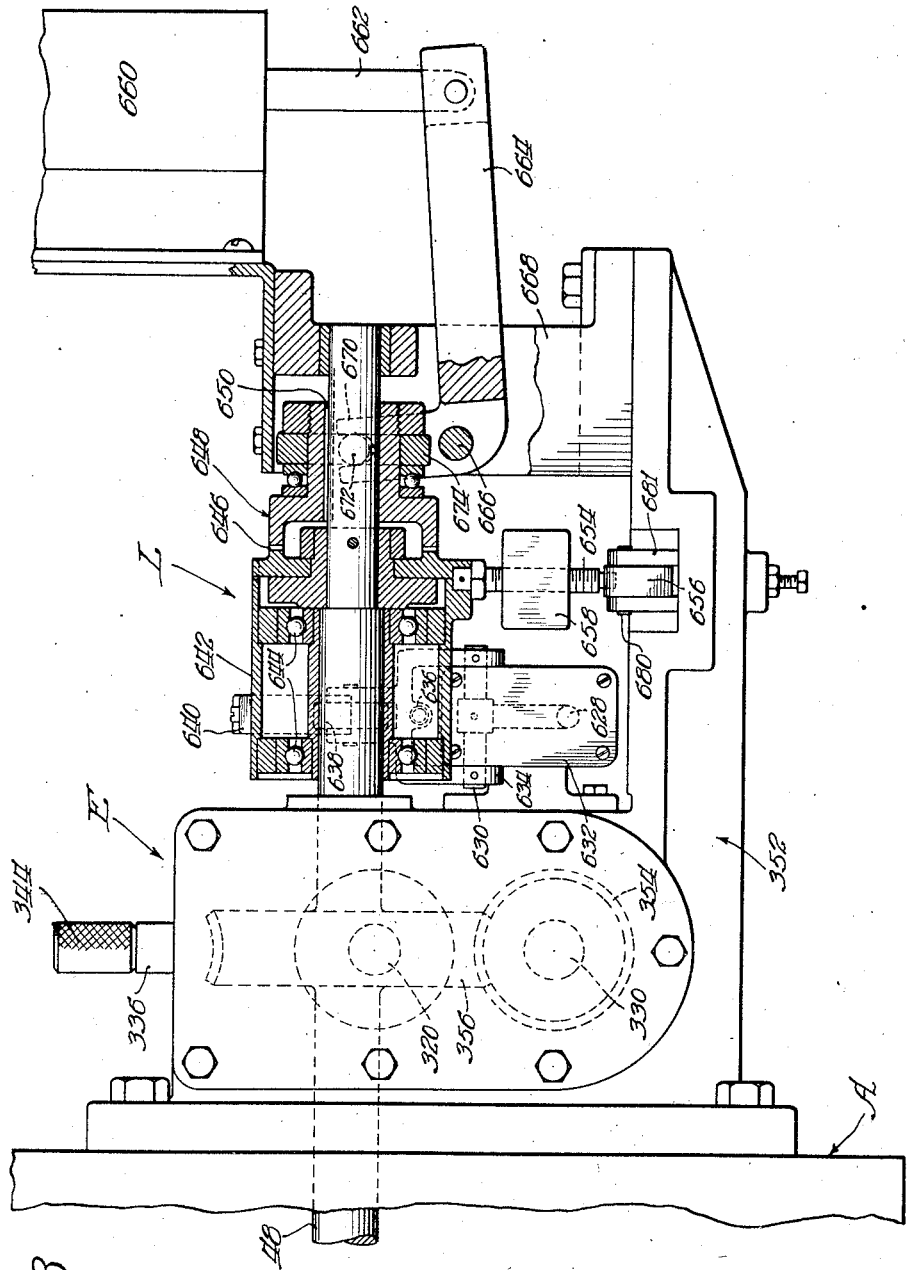

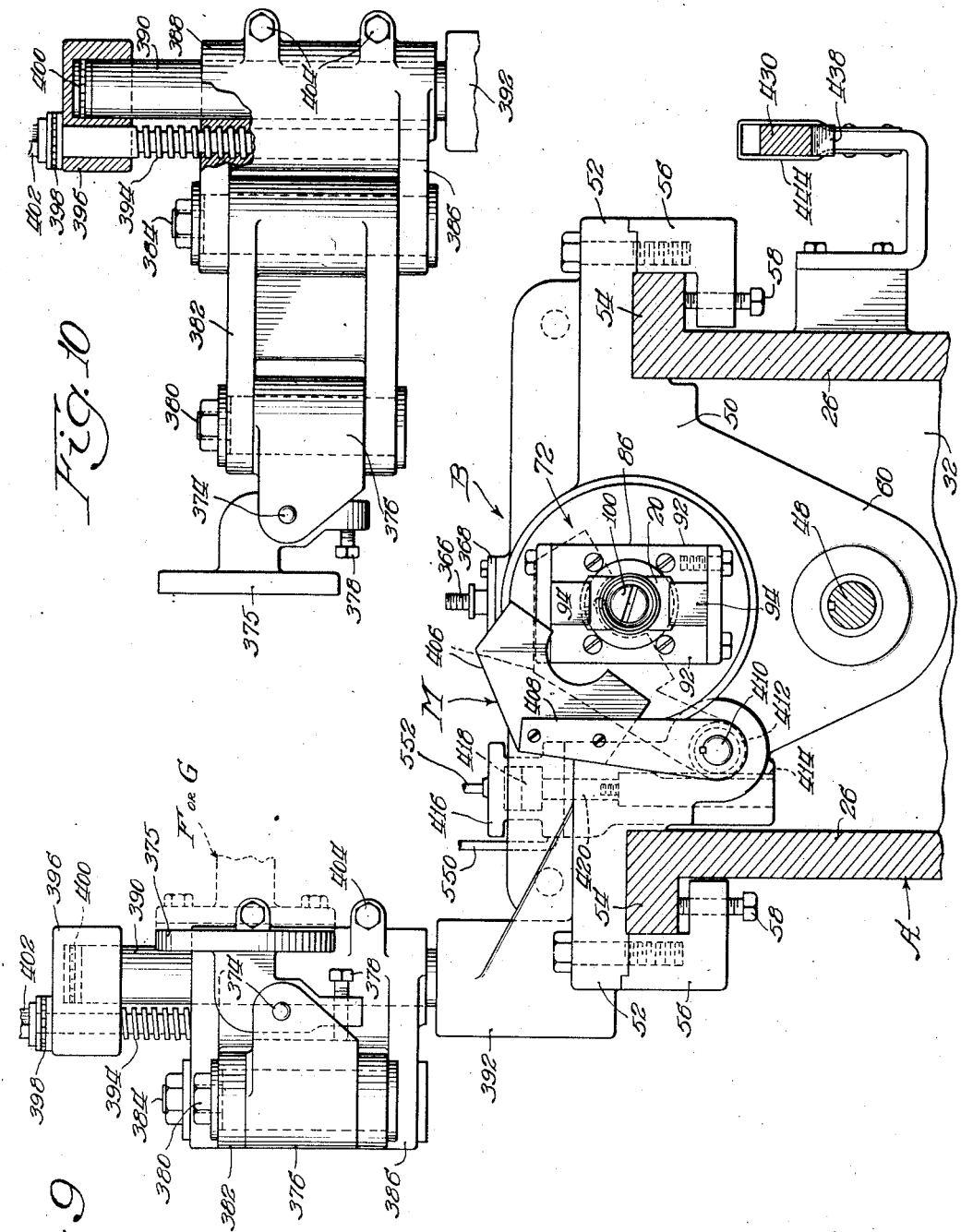

Aug 5, 1941. G. G. CARLSON 2,251,324
COMBINED ASSEMBLING PRESS AND WELDING MACHINE
Filed April 12, 1939 10 Sheets-Sheet 9
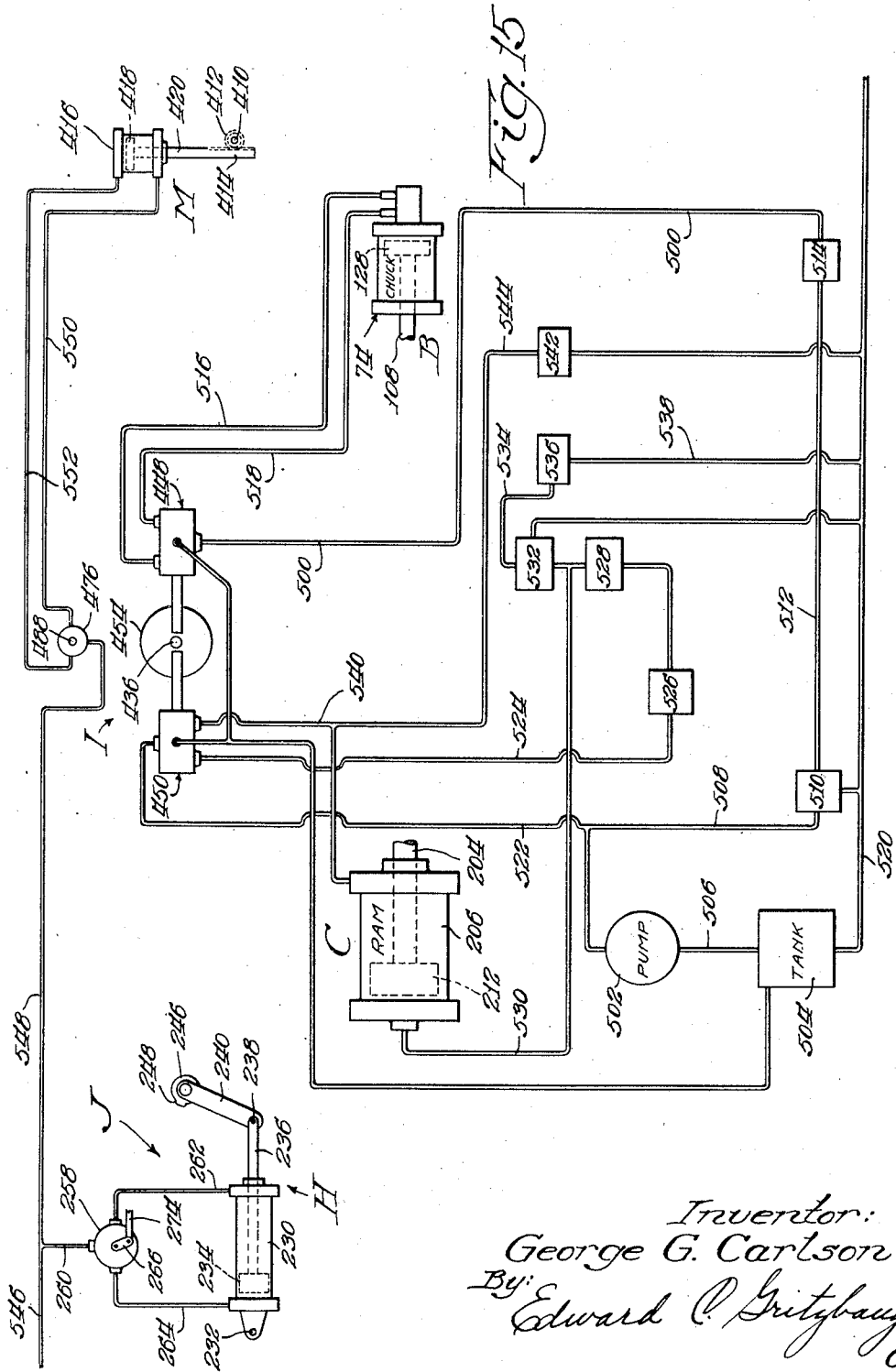
Inventor:
George G. Carlson
By: Edward C. Gritzbaugh
Atty.

Aug 5, 1941.  G. G. CARLSON  2,251,324
COMBINED ASSEMBLING PRESS AND WELDING MACHINE
Filed April 12, 1939   10 Sheets-Sheet 10
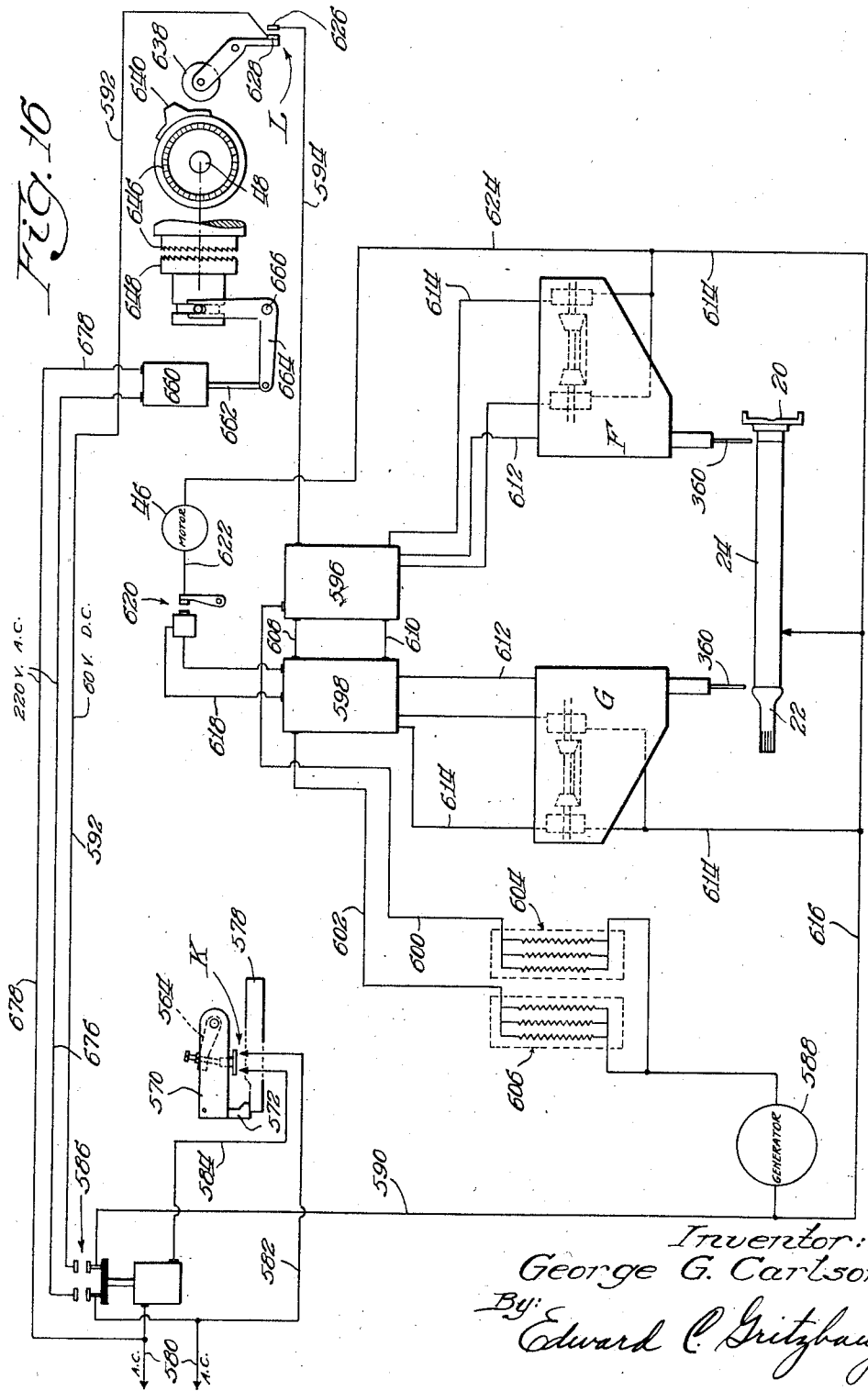
Inventor:
George G. Carlson
By: Edward C. Gritzbaugh
Atty.

Patented Aug. 5, 1941

2,251,324

UNITED STATES PATENT OFFICE 2,251,324

COMBINED ASSEMBLING PRESS AND WELDING MACHINE

George G. Carlson, Rockford, Ill., assignor to Borg-Warner Corporation, Chicago, Ill., a corporation of Illinois Application April 12, 1939, Serial No. 267,369

28 Claims. (Cl. 219—8)

This invention relates to the art of securing fittings to the ends of shafts, such as for example welding to a propeller shaft of an automotive vehicle drive, the yoke and stub end which are formed to have a press fit connection with the respective ends of the shaft prior to welding.

An object of the invention is to provide a method of attaching fittings to the respective ends of a shaft with which they are adapted to telescope with a press fit, which includes the steps of separately supporting the fittings and the shaft in axially aligned adjacent relationship in such a manner as to allow them to rotate around their common axis, pressing the fittings into telescoping connection with the respective ends of the shaft while thus supported, applying rotative power separately to each of the fittings while thus supported so as to rotate the assembled fittings and shaft without allowing either of the fittings to slip relative to the shaft while being thus rotated, and welding the fittings to the shaft during the rotation.

Another object of the invention is to provide a machine adapted to carry out, in a semi-automatic manner, the steps in the aforesaid method.

Another object of the invention is to provide, in a combined assembling press and welding machine, means to support a shaft, means to press a fitting into a press fit connection with an end of the shaft, and means, initiated at the completion of the pressing operation for welding the fitting to the shaft.

Another object of the invention is to provide, in a combined assembling press and welding machine of the type indicated in the last paragraph, means initiated at the completion of the pressing operation for releasing the shaft and fittings from the pressure of the pressing means so as to allow the shaft and fittings to be freely rotated for the welding operation.

Another object of the invention is to provide a combined assembling press and welding machine of the type indicated above, wherein the pressure releasing means is adapted to act with sufficient rapidity to allow the means for rotating the shaft and fittings to be initiated simultaneously with the completion of the pressing operation.

Another object of the invention is to provide a combined assembling press and welding machine of the type indicated above, wherein the rotating means is in the form of an electric motor which is energized simultaneously with the energizing of the welding means, by an electric switch tripped by the pressing means at the end of the forward stroke of the latter.

Another object of the invention is to provide a combined assembling press and welding machine of the type indicated above, wherein the holding of one of the fittings in assembling position is accomplished by a hydraulic chuck, and wherein the pressing means is in the form of a hydraulic press acting against the other fitting.

Another object of the invention is to provide a combined assembling press and welding machine wherein both the chucking and pressing operations are manually controlled so as to allow the operator to ascertain whether the chucked fitting is properly positioned before allowing the pressing operation to proceed, and wherein the control of both operations is effected by a single control element having a first position for initiating the chucking operation and a second position for initiating the pressing operation, and wherein subsequent operations are automatic, up to the completion of the welding operation.

Another object of the invention is to provide a combined assembling press and welding machine of the type indicated above, wherein the welding is terminated, and the rotation is stopped, at the completion of approximately one full revolution of the work, by means of a limit switch, controlled by the work rotating mechanism.

Other objects, the advantages and uses of the invention will become apparent after reading the following specification and claims, and after consideration of the drawings forming a part of the specification, wherein:

Fig. 1 is a plan view of a combined assembling press and welding machine embodying the invention;

Fig. 2 is a front elevation of the same;

Fig. 3 is a longitudinal vertical sectional view of the chucking mechanism;

Fig. 4 is a longitudinal vertical sectional view of the pressing mechanism;

Fig. 5 is a transverse sectional view taken on the line 5—5 of Fig. 4;

Fig. 6 is a detail front elevation of the starting switch and the actuating mechanism thereof;

Fig. 7 is a transverse sectional view, taken on the line 7—7 of Fig. 2;

Fig. 8 is a longitudinal vertical sectional view taken as indicated by the line 8—8 of Fig. 7;

Fig. 9 is a transverse sectional view taken on the line 9—9 of Fig. 2;

Fig. 10 is a detail elevational view of the welding unit support;

Fig. 11 is a sectional view of the manual control mechanism taken as indicated by the line 11—11 of Fig. 5 and Fig. 12 showing the manual control lever in the fully "on" position;

Fig. 12 is a transverse vertical sectional view thereof taken on the line 12—12 of Fig. 11;

Fig. 13 is a detail view of the control cam, taken on the line 13—13 of Fig. 12;

Fig. 14 is a detail view showing the manual control lever in the "off" position;

Fig. 15 is a schematic view illustrating in diagram the fluid circuit of the operating mechanism; and Fig. 16 is a schematic view illustrating in diagram the electrical circuit of the machine.

As an illustration of one form in which the invention may be embodied, I have shown in the accompanying drawings a machine for semi-automatically pressing a yoke 20 (Fig. 3) and a stub end 22 (Fig. 4) into the respective ends of a tubular torque shaft 24 of an automotive vehicle, and welding these parts in the assembled positions thus obtained.

Such a machine may include a base comprising side rails 26 connected in spaced relationship by cross members 28, 30 (Fig. 4) and 32 (Fig. 9). In the base A is mounted (Figs. 1 and 2) the chucking unit B, the pressing unit C, the work-rotating mechanism E, the welding heads F and G, the pressure relieving or backing-off unit H, the manual control means I, the automatic control means including the air valve mechanism J for controlling the backing-off unit H, the starting switch K for controlling the starting of the welding heads F and G are the work-revolving mechanism E, and the limit switch L for controlling the stopping of the welding heads and the work-revolving mechanism E, and the guard mechanism M.

The various units above pointed out are shown in detail as follows:

In Fig. 3 the chucking unit B;

In Fig. 4, the hydraulic pressing mechanism C, the backing-off mechanism H and the control therefor J, and the starting switch K;

In Fig. 5, the backing-off unit H, the control therefor J, and the starting switch K;

In Fig. 6, the starting switch K;

In Fig. 7, the work-revolving mechanism E and the limit switch L;

In Fig. 8, the limit switch mechanism L;

In Fig. 9, the chucking unit B, the guard mechanism M, and the welding head F.

In Fig. 10, the welding head support;

In Figs. 11, 12, 13 and 14, the manual control mechanism I.

The chucking and pressing-in units B and C, respectively, are arranged in the frame A in alignment on a common axis, spaced apart a distance somewhat greater than the length of the finished torque tube, and opposed to each other. The torque tube 24 is adapted to be supported in V-blocks 38 in alignment with the common axis of the chucking and pressing units B, C, so as to receive the fittings 20, 22, under the combined action of the chucking and pressing units. The V-blocks 38 may be suspended in a hanger 40 mounted between the side rails 26 of the frame A, and in a hanger 42 mounted in a cross-bracket 44 (Fig. 5) forming the base of the pressing unit C.

The chuck B is adapted to grip the fitting 20, which comprises the yoke of a universal joint, under hydraulic pressure, to pilot the fitting 20 for proper entry into the tube 24 when the latter is moved toward it under the pressure of the pressing unit C, to resist such pressure during the pressing operation so as to force the yoke into the end of the tube, as the latter advances, and, finally, at the completion of the pressing operation, to transmit revolving movement to the yoke for the welding operation.

The pressing unit C is adapted to support the stud end 22 in properly centered relationship to the torque tube 24, to move the stub end axially into the tube 24 and thereby force the tube 24 on to the yoke 20, and to thereafter revolve the stub end 22 and the yoke 20 in unison so as to revolve the entire propeller tube assembly without slippage between its parts, whereby to secure a weld of maximum strength.

The work-revolving mechanism E includes an electric motor 46 and a transmission shaft 48 for transmitting rotation simultaneously to the revolving parts of the chucking unit B and pressing unit C. The shaft 48 is located directly below and parallel to the common axis of the units B and C.

The air valve J and starting switch K are also located in conjunction with the pressing unit C, being operated by movement of the latter so as to simultaneously initiate operation of the backing off unit H, the work-revolving mechanism E, and the welding units F and G.

The welding heads F and G are mounted on the rear side of the base A above the work engaging ends of the chucking and pressing-in units B and C, respectively, and are adapted to be adjusted to the exact position required for maximum welding efficiency.

The limit switch L is coupled to the transmission shaft 48 so as to be controlled thereby, and, for convenience, is arranged preferably at the end of the machine adjacent the work-revolving unit E, although it might be located at any point along the shaft 48.

Proceeding now with a detailed description of the various parts of the machine, reference will be made first to the

*Chucking mechanism*

The chucking unit (Figs. 3 and 9) includes a frame 50 having wings 52 resting upon the upper flanges 54 of the rails 26 and clamped thereto by jaws 56 and set screws 58 so as to be adjustable longitudinally on the base A. Depending from the frame 50 are brackets 60 and 62 in which the transmission shaft 48 is journalled. The central region of the frame 50 comprises a tubular housing 64 in the respective ends of which are mounted bearings 66 and 68.

In the bearings 66, 68 is journalled a tubular spindle 70, one end of which projects from the housing 64 to carry a chuck 72, and the other end of which projects from the other end of the housing 64 and carries a cylinder 74 forming part of the hydraulic chuck operating mechanism. The entire assembly, including the spindle 70, the chuck 72, and the cylinder 74 is adapted to be rotated in the bearings 66, 68, by means of a driving gear 76 keyed upon the shaft 48, an idler gear 78 meshing with the gear 76, and a driven gear 80 keyed upon the spindle 70 and meshing with the idler gear 78. A gear cover 82, attached to the bracket 62, forms therewith a housing in which the gears 76, 78 and 80 are encased, and in which the stub shaft 84 of the idler gear 78 is mounted.

The chuck 72 includes a bifurcated head 86 (Fig. 9) having a hub portion 88 (Fig. 3) secured upon the rear end of the spindle 70 against a flange 90 thereon. Between the furcations 92 of the head 86 are mounted a pair of diametrically opposed jaws 94, the ends of which project from the head 86 and are provided with radially inwardly extending fingers 96 adapted to engage the arms 98 of the yoke 20 and to clamp the same against the central region of the head 86. Into the center of the head 86 is threaded a pilot stud 100 which is snugly receivable in the hub of the yoke 20 so as to accurately center the yoke in the chuck to support it preparatory to the closing of the jaws 94.

The jaws 94 are slidable axially under axial pressure delivered to them by a cross beam 102 pivoted at 104 in the bifurcated end 106 of a draw bar 108 which extends longitudinally through the bore of the spindle 70. The ends of the beam 102 are received in slots 110 in the jaws 94. The bifurcated end 106 of the draw bar is received in a cavity 112 in chuck head 86. The beam 102 extends through slots 114 in the head 86. The draw bar 108 is mounted in bushings 116 in the spindle 70.

The end thrust to which the chuck is subject during the pressing operation is transmitted from the head 86 through the flange 90 to the inner race of the bearing 68 the latter being secured against the flange 90 by a nut 118 threaded on the spindle 70. The gear 80 and bearing 66 are assembled between a washer 120 located against a shoulder 122 on the spindle 70, and the hub of a face plate 124 which is threaded on the forward end of the spindle 70. The cylinder 74 is mounted upon the face plate 124.

Threaded upon the forward end of the draw bar 108 is the piston rod 126 of a piston 128 slidably mounted in the cylinder 74. The piston rod 126 extends through a packing gland 130 in the end wall 132 of the cylinder 74.

In the operation of the chucking unit, fluid is introduced through an inlet port 136 into a chamber 134 formed between the piston 128 and the cylinder end wall 132. This moves the piston 128 to the right as viewed in Fig. 3, thus moving the jaws 94 into engagement with the yoke 20 which has been previously inserted over the pilot stud 100 by the operator, and thoroughly clamping the yoke against the head 86. Upon completion of the welding operation, fluid is admitted to a chamber in the cylinder 74 (not shown) formed between the forward end of the piston and the forward end of the cylinder, so as to move the piston rearwardly, the fluid in the chamber 134 being allowed to escape, whereby the jaws 94 will be moved to "open" position so as to allow the finished work to be taken out of a machine.

*Pressing mechanism*

Referring now to Figs. 4 and 5, the pressing mechanism includes the bracket 44 which is secured at 150 to the rails 26. In the bracket 44 are formed a pair of slideways having bottom surfaces 152, side surfaces 154, and top surfaces 156, the latter being defined by flanges 158.

Pressure for driving the stub end 22 into the torque tube 24 is transmitted to it by a ram 162 including a cylindrical shell 164 having side wings 166 slidably mounted in the slideways 152, 154, 156. The shell 164 has a cylindrical bore 167 in which is journalled a revolving cylinder 168 having at its respective ends fixed and detachable flanges 170, 172, respectively, in engagement with the respective ends of the shell 164. At its rear end the revolving cylinder 168 has a hub 174 upon which is mounted a gear 176. The gear 176 meshes with an idler gear 178, which in turn meshes with a gear 180 keyed upon the rear end of the transmission shaft 48. The said rear end of the shaft 48 and the stub shaft 181 of the idler gear 178, are journalled in a gear casing comprising a bracket 182 formed integrally with and depending from the ram shell 164, and a cover plate 184 secured to the bracket 182.

Removably mounted in the revolving cylinder 168 is a stub end locator sleeve 186 having a bore 188 terminating in an internally splined section 190 adapted to receive the splined portion 191 of the stub end 22. The locator sleeve 186 is made removable in order that sleeves of varying internal conformation may be substituted, one for another, for receiving stub ends of different shapes and sizes. The flange 170 of the revolving cylinder 168 is provided with jaw clutch teeth 171, adapted to clutchingly engage lugs 173 formed on the locator sleeve 186. Where the stub end is of the type shown in the drawings, having a reduced shank portion, a guide bushing 192 may be mounted in the forward end of the bore 188, to support such reduced shank portion, the bushing being internally toothed so as to allow passage of the spline section 191.

The rear end of the stub end 22 is adapted to abut against a pressing head 194 received in an enlargement 196 of the bore 188 and engaged against the rear end of the cylinder 168.

Attached to the rear end of the ram shell 164 is a yoke 198 to which is secured, by means of a nut 200, the reduced forward end 202 of the hydraulic piston shaft 204. The shaft 204 projects into a cylinder 206 which is mounted between cylinder heads 208, 210, the heads 208, 210 in turn being mounted between the side rails 26 of the base. On the rear end of the shaft 204 is a piston 212, which is fitted into the cylinder 206 so as to form between it and the rear head 208, a chamber 214 into which fluid may be introduced for pushing the ram forwardly, and, between it and the forward cylinder head 210, a chamber 216 into which fluid may be introduced for returning the ram to its starting position. The piston rod 204 extends slidably through a packing gland 218 in the forward head 210.

In the operation of the pressing mechanism, fluid is introduced into the chamber 214 through a port 220, forcing the piston 212 forwardly. Pressure is transmitted from the shouldered forward end of the piston rod 204 to the yoke 198, thence to the ram shell 164, thence from the forward end of the shell 164 to the revolving cylinder 168, thence from the rear end of the cylinder 168 to the pressing head 194, thence to the rear end of the stub end 22. As the ram advances, the stub end 22 will engage with and enter the torque tube 24. The end thrust thus transmitted to the torque tube 24 will cause the latter to commence to telescope the hub 20 of the yoke, and the pressing in of both fittings will proceed to completion simultaneously, the torque tube 24 sliding axially in its V-block bearings 38 during the operation.

The return stroke of the ram is accomplished by delivering fluid to the chamber 216 of the cylinder 206 through a port 222 in the forward head 210.

As the ram moves axially in either direction, the gear 180 will be carried along with it, sliding on the shaft 48 and remaining in keyed relation thereto by the sliding of its key in the elongated key-way 224.

The hydraulic pressing mechanism shown is capable of developing ample power to exert the pressures needed for effecting the tight press-fit of the fittings in the ends of the torque tube, which pressures may, for example, reach a thousand pounds at the end of the pressing stroke.

Backing-off unit

The backing-off unit is best illustrated in Figs. 1, 2, 4 and 5. A quick-acting mechanism is required for this purpose, and accordingly an air motor is employed, including a cylinder 230, pivoted at 232 to the forward rail 26, and having a piston 234 connected to a piston rod 236. The forward end of the rod 236 is pivoted at 238 to one end of a lever 240 the other end of which is attached to a shaft 242 journalled in bearing brackets 244 formed integrally with the main bracket 44. Intermediate the brackets 244, directly above the major axis of the machine, the shaft 242 is formed with a cam 246 which has a slight rise 248 adapted, when the cam is rotated counter-clockwise as viewed in Fig. 4, to engage a cam block 250 of hardened material inset into a bracket 252, which is mounted upon the yoke 198, and therefore rigidly associated with the ram. The base of the bracket 252 may be rabbeted as at 254 into the yoke 198 so as to form an adequate thrust-transmitting connection between the two. The bracket 252 may be secured to the yoke 198 as by means of machine screws 256.

The control mechanism J for the backing-off unit includes the air valve 258 having an inlet 260 communicating with a source of air pressure, and two outlets communicating through tubes 262 and 264, respectively, with the forward and rear ends of the cylinder 230. The valve is a conventional type of two-way valve which in one position, as determined by the position of the valve arm 266 allows air to flow from the inlet 260 to the tube 262, and thence to the forward end of the cylinder 230, and, when in the position indicated by the dotted line showing of arm 266, allows air to flow from the inlet 260 through the tube 264 to the rear end of the cylinder 230.

When air is thus supplied to the rear end of the cylinder 230, the piston 234 will be driven rapidly forwardly, swinging the arm 240 to the right as viewed in Fig. 2, and rotating the cam 246 counter-clockwise so as to bring the rising portion 248 thereof into contact with the cam block 250, thereby forcing the ram rearwardly a slight distance against the pressure in the chamber 214 of the hydraulic pressing mechanism, which at the forward end of the ram stroke is reduced to, for example, 50 lbs. per sq. inch. The backing-off mechanism is able to accomplish this because of the great leverage multiplication in the arm 240 and cam 246.

As the piston moves forwardly, the air in the forward region of the cylinder 230 will bleed through the tube 262 and back through the valve. Likewise, when the piston is moving rearwardly, the air in the rear end of the cylinder will bleed through the tube 264 and back through the valve, the latter being constructed in a well known manner so as to allow such bleeding in either of its positions of adjustment, and therefore not being illustrated in detail.

The valve 258 is operated by the ram 162 through the medium of the bracket 252 and the valve operating mechanism, which includes a valve operating rod 268 extending through an opening 270 in the bracket 252, and slidably mounted in bearings in the respective ends of a valve mechanism casing 272 mounted upon the cylinder heads 208 and 210. The valve 258 is mounted upon the casing 272, and its operating arm 266 is connected to the operating rod 268 through the medium of a link 274, pivoted at one end to the valve arm 266, a lever 278 pivoted at one end to the other end of the link 274, a shaft 282 on which the other end of the lever 278 is mounted, the shaft 282 extending transversely through the casing 272 and journalled in the side walls thereof, a fork 284, one end of which is mounted upon the shaft 282 inside the casing 272, and a sleeve 286 slidably receiving the operating rod 268, the sleeve 286 having a groove 288 receiving the pins 290 of the fork 284. The sleeve 286 is square in exterior cross-section, so as to provide flat faces which are embraced by the fork 284 so as to prevent it from rotating. On its underside, the sleeve 286 is provided with a detent 292 adapted to coact with a trigger 294 for holding it in a set position, against the pressure of a coil spring 296 encircling the rod 268 between the sleeve 286 and a collar 298 secured on the rod.

The spring 296 urges the sleeve 286 in a direction to move the valve 258 to a position wherein air is admitted to the rear end of the cylinder 230 for the backing-off operation. The valve operating mechanism is set by the ram during the completion of its return stroke, through the medium of the bracket 252 engaging a collar 300 fixed on the shaft 268, thereby moving the shaft to the left as viewed in Fig. 4, and causing a collar 302 secured on the rod 268 inside the casing 272, to engage the forward end of the sleeve 286 and move it rearwardly, until the detent 292 rides over the end of the trigger 294, whereupon the latter will be swung upwardly around its pivot 304 by a spring 306 stretched between the trigger and the top of the casing 272.

The trigger 294 is released at the end of the advancing stroke of the ram. As the ram advances to perform the pressing operation, the bracket 252 will, near the end of the advancing stroke, engage a collar 308 secured on the forward end of the shaft rod 268. During the completion of the ram stroke, the rod 268 will be drawn forwardly, compressing the spring 296. At the end of the stroke, a conical face 310 of the collar 302 will engage an incline 312 on the trigger 294 so as to force the trigger 294 downwardly, thereby releasing the sleeve 286 and allowing the spring 296 to propel the same forwardly so as to shift the valve to position for operating the back-off mechanism.

Welding mechanism

The welding mechanism is shown in Figs. 1, 2, 3, 9 and 10. The welding heads F and G shown in Fig. 2 in dotted lines, are standard General Electric electric arc-welding units each including a downwardly projecting electrode 360 in the form of a downwardly feedable wire of welding metal, and each mounted so that the electrode 360 may be adjusted with reference to the work. The electrode 360 of the unit F is positioned to register with the end of the torque tube 24 and the shoulder 362 of the yoke 20 when the tube has been pressed into assembled position. The yoke is grounded to the welding unit through the chuck 72 in which it is tightly clamped, the chuck spindle 70, a conductor ring 364 encircling the spindle 70, and carried by a stud 366 slidably mounted in an insulating bushing 368 in the chuck spindle housing 64 under the pressure of a coil spring 370, and the ground wire 372 of the welding unit F.

The electrode 360 of the welding head G is positioned to register with the junction between the other end of the propeller tube 24 and the shoulder 365 of the stub end 22 at the end of the pressing operation. The stub end 22 is grounded through the pressing head 194, a conductor shaft 367 mounted in the head 194 and projecting rearwardly through the hollow hub 174 of the cylinder 168, brushes 371 mounted in the yoke 198 and engaging the shaft 367, and a suitable conductor 373 leading from the brushes 371 to the ground wire 616.

Each welding unit is mounted on a bracket 375 which is pivoted at 374 on a horizontal axis in a yoke 376, and tiltably adjusted with reference to the yoke 376 by a set screw 378. The yoke 376 in turn is pivoted at 380 on a vertical axis in one end of a horizontally swingable arm 382, the other end of which is pivoted at 384 in a vertically adjustable bracket 386. The bracket 386 has a clamp portion 388 adapted to be clamped upon a post 390 mounted in a boss 392, which, for the welding unit F, is formed integrally with one of the wings 52 of the frame 50 of the chucking unit, and, in the case of the welding unit G, is formed integrally with the ram bracket 44.

The bracket 386 is vertically adjusted by means of an adjusting screw 394, suspended from a swivel head 396 on the top of the post 390. End thrust anti-friction bearings 398 and 400 are employed to carry the load from the adjusting screw 394 to the swivel head 396 and from the swivel head 396 to the top of the post 390, respectively. The screw 394 is provided with a squared head 402 to which a wrench may be applied for rotating the screw.

The three vertical pivots 380, 384, 390 allow a welding unit to be adjusted either transversely or longitudinally of the machine. The horizontal pivot 374 allows the unit to be tilted around an axis parallel to the axis of the work, and the adjusting screw 394 provides for bodily raising or lowering the welding unit. Tightening the clamp screws 404 of the clamp 388 takes the vertical load off of the screw 394 and secures the bracket 386 against lateral swinging.

*Shield mechanism*

In connection with the welding unit F, there is provided a shield 406, carried by an arm 408 mounted on a shaft 410 journalled in the frame member 50, and adapted to swing from an inoperative position shown in full-lines in Fig. 9 to the dotted line position shown in that figure, and, in the latter position, to shield the chuck 72 from the welding arc, thus avoiding overheating of the chuck and consequent interference with the insertion of yokes therein by the operator. On the shaft 410 is a pinion 412 meshing with a rack 414 slidably mounted in the frame 50. A piston 418 connected to the rack 414 by means of a piston rod 420, operates in an air cylinder 416. The shield is moved to its operative position during the pressing operation, being controlled by the manual control mechanism which initiates the pressing operation, as will be described more in detail hereinafter.

Instead of the shield 406, a ground device, for assisting the ground 364, may be operated by the air mechanism just described.

*Work-revolving mechanism*

The work-revolving mechanism (Figs. 1, 2, 7 and 8) includes the motor 46, which is mounted on a bracket 314 on the rear of the base A, and has a shaft 319 coupled by a flexible coupling 313 to a shaft 315, journalled in a housing 316. On the shaft 315 in the housing 316 is a worm 317 meshing with a worm wheel 318 on a transversely arranged gear shaft 320 leading to the change speed gear mechanism shown in Fig. 7, for transferring the drive to the transmission shaft 48.

The change speed gearing includes a pair of gears 322 and 324 loosely mounted on the gear shaft 320, and each meshing with a respective gear 326, 328 secured on a countershaft 330. A shiftable clutch element 332 is slidably and non-rotatably mounted on the shaft 320 for movement into engagement with jaw clutch elements 334 on the respective gears 322, 324, so as to selectively transfer the drive from the shaft 322 to either the gear 322 or the gear 324. The clutch element 332 is controlled by a lever 336 secured on an eccentric 338 having an eccentric pin 340 engaging in a groove 342 in the slidable clutch element 332. The lever 336 has a handle 344 terminating in a spring urged plunger 346 engageable in either of two depressions 348 in a keeper member 350, for determining the two positions of gear shift.

The shafts 320 and 330, and the shifting eccentric 338, are journalled as shown in the gear casing 352 secured to the forward end of the machine.

The transmission shaft 48 is driven from the counter-shaft 330 by a worm 354 on the latter shaft, meshing with a worm-wheel 356 mounted on the shaft 48 inside the housing 352 into which the forward end of the shaft 48 projects and is journalled.

The drive is transferred from the motor shaft 319 through the flexible coupling 313 to the shaft 315 and the worm 317, thence to the worm-wheel 318, thence to the shaft 320, thence to the slidable jaw clutch 342, thence, to either one of the jaw clutch elements 334 and the gear 324 or 322 associated therewith, thence to the gear 328 or 326, thence through the shaft 330 to the worm 354, thence to the worm-wheel 356, thence to the shaft 48, and the gears 76, 180 mounted thereon, thence to the idlers 78, 178, thence to the gears 80, 176, and thence to the chuck-spindle 70 and stub end locator sleeve drive cylinder 168.

The clutch 342, 334 is simply for the purpose of changing the gear ratio between the motor and transmission shaft 48. The starting and stopping of the rotation of the work is controlled by the starting and stopping of the motor 46, which in turn is controlled by the starting switch K and the limit switch L respectively.

*Manual control mechanism*

Referring now to Figs. 2, 11, 12, 13 and 14, there is provided a manual control rod 430 pivoted at 432 to one end of a control lever 434, the other end of which is mounted on a valve shaft 436 journalled in the rails 26. The control rod 430 has three positions of adjustment determined by steps 438, 440, and 442 formed on its underside and adapted to coact with a keeper 444 in which the free end of the lever slides.

Turning now to Figs. 11, 12, 13, and 14, on the rear rail 26 is mounted a panel 446 which carries the chuck control valve 448 and the ram control valve 450, at its respective ends. Mounted on the central region of the panel 446 in spaced relation thereto, is a bracket 452. The valve shaft 436 projects through the panel 446 and the bracket 452, and a valve control cam disc 454 is secured to the shaft 436 between the panel 446 and the bracket 452. The cam disc 454 is provided with cam slots 456 and 458 respectively for controlling the chuck and ram valves 448 and 450 respectively. Each valve has a valve rod 460 attached to a pull rod 462 slidably mounted in the bracket 452 and carrying at its end a roller 464 received in a cam slot 456 or 458 as the case may be.

The three positions of the control lever 434 corresponding to the positions of the control lever determined by stops 438, 440 and 442 respectively, are indicated in Fig. 11 as of the "off," "#1" and "#2" positions, respectively. In the "off" position, both rollers 464 are positioned in the inner dwell portions 466 and 468 respectively of the cam slots 456 and 458, and both valves 448 and 450 are adjusted to positions for maintaining their respective chucking and pressing units in their initial work-receiving positions.

When the control lever 434 is moved to the "#1" position, the rising portion 470 of the cam slot 456 will move the corresponding roller 464 radially outwardly, thus shifting the "#1" valve to position for supplying fluid to the chamber 134 of the chuck-operating cylinder, thereby causing the chuck jaws to close upon the work. During this operation, the dwell portion 468 of the cam slot 458, will rotate with respect to its roller 464, without moving the latter. Accordingly, the "#2" or ram-controlling valve will not be changed.

When the lever is moved to the "#2" position, the outer dwell portion 472 of the cam slot 456 will assume control of its roller 464, holding the "#1" valve in the position to which it has just been adjusted. Simultaneously, the rising portion 474 of the cam slot 458 will move its corresponding roller 464 radially outwardly, thereby shifting the "#2" valve to position for delivering fluid to the chamber 214 of the pressing mechanism so as to advance the ram 162 for the pressing operation.

Simultaneously with the adjusting of the "#2" valve to the position just mentioned, an air valve 476, mounted on a rearward extension 478 of the bracket 452, is adjusted to a position for delivering air under pressure to the lower chamber of the air cylinder 416 so as to lower the guard 406 to its operative position.

The operating mechanism for the air valve 476 includes an arm 480 secured to the control shaft 436 and carrying a set screw 482 adapted to engage against the short arm 484 of a bell crank lever 486 secured to the valve shaft 488 of the air valve 476, when the manual control lever 434 commences to move from the "#1" to the "#2" position.

The valve 476 is urged toward its other position by a weight 490 suspended by a rod 492 from the long arm 494 of the bell crank lever 486. Movement of the bell crank lever 486 under the pull of the weight 490 is limited at the "#1" position, as shown in Fig. 14, by a stop 496 in the form of an integral projection on the casing of the valve 476 disposed in the path of movement of a lug 498 formed on the bell crank lever 486.

It will now be apparent that the air valve operating mechanism constitutes a lost motion connection between the control shaft 436 and the air valve shaft 488. During movement of the control lever 434 between the "off" and "#1" positions, the bell crank lever 486 remains supported against the stop 496, and the arm 480 swings freely with its set screw 482 out of contact with the bell crank lever. During movement between the "#1" and "#2" positions, the arm 480 and the bell crank lever 486 move together as a unit, being maintained in contact with each other by the weight 490.

The timing of the air valve with respect to the hydraulic valve may be varied within limits by changing the position of the adjusting screw 482, so that if desired, the opening of the air valve may be set to occur before or after the beginning of the pressing operation instead of simultaneously therewith.

The chuck control valve 448 is supplied with fluid through a line 500 which is connected to a suitable pump 502 (Fig. 15) arranged to pump the fluid from a reservoir 504 through a line 506 and to deliver it to the respective valves 448 and 450. The pump 502 is adapted to deliver a pressure of a thousand pounds per square inch. However, this pressure cannot be used for all of the hydraulically operated units, the chucking unit requiring only two hundred fifty pounds per square inch, and the pressing unit requiring a thousand pounds during the pressing operation and one hundred fifty pounds for the return stroke of the ram.

Accordingly, a series of pressure control valves are employed in connection with the main hydraulic control valves 448 and 450. From the pump 502, the fluid passes through a pipe 508 to a release valve 510 which is set at eleven hundred fifty pounds pressure, thence through a pipe 512 to a reducing valve 514, which is set for 250 pounds constant pressure, thence through the line 500 to the "#1" or chuck control valve 448.

From the valve 448, the fluid passes through a pipe 516, when the control lever is in the "#1" position, to the inlet 136 of the chuckling cylinder and thence into the chamber 134 thereof for closing the jaws of the chuck. The excess fluid is by-passed through the valve 510 into a return pipe 520 and thence back to the tank 504.

When the control lever 434 is in the "#2" position, fluid, supplied to the "#2" valve through a line 522 leading directly from the pump 502, will be delivered from the valve 450 through a pipe 524 directly to the inlet 220 of the ram cylinder 206, and thence into the chamber 214 for carrying out the pressing operation. The pipe 524 is connected to a valve 526, which is set for two hundred fifty pounds, and thence to a valve 528 and a pipe 530 and the inlet port 220 of the pressing cylinder 206, into the chamber 214 of the pressing cylinder 206, so as to carry out the pressing operation. When the pressure in the chamber 214 is built up to approximately one thousand pounds, which occurs at the end of the pressing operation, a valve 532 will open, allowing fluid to be by-passed through a pipe 534, a valve 536, and a pipe 538 to the return line 520. The valve 536 allows the pressure in the ram cylinder to drop to fifty pounds during the welding operation.

When the control lever is in the "off" position, fluid is delivered from the "#2" valve 450 through a pipe 540 into the chamber 216 of the ram cylinder 206, so as to return the ram to its starting position. A valve 542, connected to the line 540 by means of a pipe 544, and to the return line 520, maintains the pressure in the ram cylinder at 150 pounds during the return stroke. Simultaneously, the chucking jaws will be opened as hereinbefore described. Air for operation of the guard mechanism is delivered from an air supply 546 through a supply line 548 to the inlet of the air valve 476. When the control lever is in the "off" position or the "#1" position, air will be delivered from the valve 476 through a pipe 550 to the lower chamber of the air cylinder 416, thereby lowering the guard 406 to its operative position. When the lever is in the "#2" position, air will be delivered from the valve 476 through a pipe 552 to the upper chamber of the air cylinder 416, thereby raising the guard to its inoperative position.

Automatic controls

The ram having been advanced to the end of the pressing-in stroke, as a result of moving the manual control lever to the "#2" position as described above, the welding operation will proceed automatically without the control of the operator. The beginning of the welding operation involves the simultaneous starting of the welding arcs and of the work-rotating mechanism, through the instrumentality of the starting switch K (Figs. 5 and 6).

The starting switch K embodies a simple push button type of switch 556, mounted in a housing 560 which in turn is secured at 562 upon the rear slide flange 156, of the ram slide-way. A switch operating arm 564 is mounted within the housing 560 upon a shaft 566 transversely journalled therein, and at its free end carries an adjustable stud 568 arranged to engage the push button of the switch 556.

Secured upon the shaft 566 outside of the housing 560 is an operating lever 570. A cam follower pawl 572 is received in a slot 574 in the end of the lever 570, and pivoted at 576 between the furcations formed by the slot 574, near the upper end of the slot. Below the pivot 576, the pawl 572 is adapted to engage the inner extremity of the slot 574 so as to be limited, in its swinging movement toward the lever 570, at the upright position shown in Figure 6.

In this upright position, the lever 572 is adapted to rest upon a cam 578 carried by the ram 162.

At approximately the end of the advancing stroke of the ram, the cam 578, moving in the direction indicated by the arrow 579, will arrive at a position as shown in Fig. 6 wherein the pawl 572 will drop off the cam. When this occurs, the switch operating arm 564, swinging downwardly under its own weight supplemented by that of the lever 570 and the pawl 572, will depress the button of the switch 556 and establish a circuit through the welding heads F and G and the motor 46, of the work revolving mechanism.

The electrical circuit actually employed in carrying this out, involves a very complicated system of relays and the like, and since it is largely conventional in its detailed aspects, only a very skeletonized diagram of the circuit is shown in Fig. 16. As shown by this diagram the closing of the starting switch K establishes a circuit from a source of supply 580 of 220 volt alternating current through wires 582 and 584 to a solenoid operated switch 586. The switch 586, in turn establishes two circuits, one a 60 volt direct current circuit including, in series, a constant potential direct current generator 588, a conductor 590, one side of the switch 586, a conductor 592, the limit switch L, a conductor 594, the welding head control units 596 and 598, and the conductors 600 and 602 respectively leading from the welding control units 596 and 598 respectively, through resistors 604 and 606 respectively back to the generator 588. The control units 596 and 598 are conventional welding head controls, wired in parallel as indicated by the conductors 608, 610, respectively, and each including a solenoid operated switch, moved to closed position by the energizing of the circuit just described. The closing of these welding unit control switches establishes parallel circuits from the generator 588 through the resistors 604 and 606 and conductors 600, 602, through the welding control units 596, 598, through the welding arcs 612 and the feed circuit 614 for controlling the feeding of the welding electrodes 360, to the ground 616 leading back to the generator 588.

As soon as the voltage of the welding arcs has been built up to a proper level for welding, a solenoid operated switch 620, normally open, will be closed so as to energize the work revolving motor 46 through a circuit parallel to the welding head circuits, including a conductor 618 which is in electrical communication with the conductor 594, a conductor 622, the motor 46, and a conductor 624 leading to the ground 616.

The circuits to the motor 46 and welding heads, thus established, will remain energized during slightly more than one complete rotation of the work, during which time the joints between the respective fittings and the tube 24, will be joined by welds which overlap slightly at their ends.

The circuits to the welding heads and motor 46 are deenergized by the limit switch L, which, as shown in Fig. 7, includes a stationary contact 626 normally engaged by a switch arm 628 mounted on shaft 630 journalled in the switch housing 632. An arm 634, secured upon the shaft 630 outside of the housing 632, is engaged by a compression spring 636 so as to urge the switch arm 626 toward its closed position shown.

In the outer end of the arm 634 is journalled a roller 638 which, when the work has completed a revolution, is engaged by a cam 640 carried by a sleeve 642 rotatably mounted by means of bearings 644 (see Fig. 8) on the forward end of the transmission shaft 48. The sleeve 642 is provided with jaw clutch teeth 646 which are adapted to engage with mating teeth of a shiftable jaw clutch element 648 splined at 650 upon the shaft 48. When clutch elements 646, 648 engage, the sleeve 642 will rotate with the shaft 48 in the direction indicated by the arrow 652 in Fig. 7.

The starting position of the cam 640 is shown in full line in Fig. 7. This position is determined by the engagement of the end of a stud 654, mounted in the sleeve 642, with the end of a trigger 656, under the urge of a weight 658 adjustably threaded upon the stud 654. The weight 658 is eccentric relative to the stud 654 in order to assure full contact with the trigger 656.

Prior to the closing of the starting switch K, the sleeve 642 is freely rotatable on the shaft 48 due to the clutch elements 646, 648 being disengaged. The control for the shiftable clutch element 648 comprises a solenoid 660, the armature 662 of which projects downwardly and is pivoted to a bell crank lever 664. The bell crank lever 664 is pivoted at 666 in a bracket 668 carried by the bracket 352, and has a fork 670 coacting with the trunnion 672 of a clutch throw-out ring 674 rotatably mounted on the shiftable clutch element 648. The weight of the armature 662 and lever 664 normally maintains the clutch element 648 in its disengaged position.

Closing of the starting switch K establishes, in addition to the direct current circuit through the welding heads and motor 46, as previously described, a second circuit, leading from the source 580 of alternating current, through the other side of the switch 586, a conductor 676, the solenoid 660, and a conductor 678 leading back to the source of energy 580. This circuit energizes the solenoid 660, drawing the armature 662 upwardly and moving the clutch element 648 into clutching engagement with the clutch teeth 646. Thus the sleeve 642 becomes drivingly connected to the shaft 48 at the same time that the latter commences to rotate.

The gearing between the shaft 48 and the chucking and pressing units is arranged so that the slightly more than one revolution of the latter is accompanied by approximately ⅞ of a revolution of the shaft 48. At the end of this ⅞ revolution, the weight 658 and cam 640 will have rotated, in the direction indicated by the arrow 652, to the position shown in dotted lines. In this position of the cam 640, it will have engaged the roller 638 and thereby moved the switch arm 634 to the position shown in dotted lines, opening the limit switch L. This breaks the circuit between the starting switch K and the welding head control units 596, 598, and the motor 46. As a result, the switch 620 will open immediately, stopping the motor 46, while the power to the electrodes is maintained until the arcs become extinguished in a conventional manner.

The alternating current circuit to the solenoid 660 remains closed after the de-energization of the welding heads and the work revolving motor circuits, in order to avoid reclosing of the limit switch L prior to the opening of the starting switch K. When the latter does open, the operating circuit of the solenoid switch 586 will be de-energized, and the switch 586 will therefore open, de-energizing the solenoid 660 and declutching the sleeve 642 from the shaft 48. The weight 658 which has previously been supported in the position shown in dotted lines, will then swing through the remaining ⅛ of its revolution, passing the trigger 656 which is pivoted at 680 in the bracket 681, and depressing it against the resistance of a coil spring 682 which, as soon as the stud 654 has passed the end of the trigger 656, raises the latter to its full line position so as to catch the stud upon its back swing. Thus the limit switch L is reset for the next operation, becoming closed as soon as the cam 640 rides on beyond the roller 638. If this resetting operation were allowed to take place prior to the opening of the starting switch, the circuit through the welding units and work rotating motor would be re-established. Therefore provision is made for holding the cam 640 in engagement with the roller 638 so as to maintain the limit switch open during the interval between the de-energization of the welding and work rotating units and the opening of the starting switch.

Returning now to the starting switch, it may be pointed out that it is necessary that this switch remain closed during the backing off operation. Accordingly, the opening of the switch does not occur at the same point in the travel of the ram as the closing, but is delayed so as to allow the ram to complete a substantial portion of its return stroke before the opening occurs. To this end, the pawl 572, which controls the closing of the switch, by dropping off the end of the cam 578, is pivoted so as to trail against the cam 578 without raising the arm 570 during the return stroke of the ram. The opening of the switch K is controlled by a cam follower stud 684, adjustably mounted in the arm 570 by being threaded therethrough, and adapted to engage a rise 686 on the cam 578, so as to raise the arm 670 to a position allowing the switch 556 to open and allowing the cam 572 to swing back to a depending position wherein it may engage the low part of the cam upon the next forward stroke of the ram, and support the arm 570 until it again reaches the end of the cam 578.

This completes the detailed description of the machine. The operation of the various parts thereof has been described in detail in connection with the foregoing description, but, in order to present a co-ordinated picture thereof, will be reviewed in the following:

Summary of operations

To start the operation of the machine, the operator closes a master control switch (not shown) which energizes the generator 588 and brings the A. C. current supply up to the solenoid switch 586. A torque tube 24 is then placed in the V blocks 38, and a yoke and stub end 20, 22 are inserted over the pilot 100 and into the locator sleeve 186 respectively. The operator then moves the manual control rod 430 to the left as viewed in Fig. 2, to its intermediate position determined by the stop 440. This movement causes the valve 448 to assume a position to deliver fluid under pressure from the pump 502 to the chucking unit cylinder 74, resulting in the chucking jaws 94 closing upon the yoke arms 98 of the yoke 20, and the valve 450 to deliver fluid under pressure from the pump 502 to the cylinder 206 of the ram unit so as to advance the ram toward the tube 24. During the ram stroke, the bracket 252 carried by the ram will engage the collar 308 of the back-off control valve operating rod 268, sliding the rod 268 forwardly through the sleeve 286 which is held back by the trigger 294 and thus compressing the spring 296. At the end of the ram stroke, the cammed face 310 of the sleeve 302 will engage the trigger 294, depressing it and releasing the sleeve 286, allowing the latter to be propelled forwardly by the spring 296, and thereby shifting the valve 258 to a position wherein air under pressure from the air supply 546 is delivered to the air cylinder of the backing off unit H, so as to rotate the cam 248 counter-clockwise against the cam element 250 and thereby force the ram rearwardly a slight distance against the pressure of 50 lbs. to which the fluid in the chamber 214 has been reduced as a result of the opening of the valve 532 under the thousand lbs. pressure which is built up at the end of the ram stroke. The fittings 20, 22, will now have been pressed completely into the ends of the tube 24 and the ram will have been backed away into a position allowing free rotation of the tube, and will be held in that position by the pressure of 50 lbs. urging the ram against the cam 248.

Simultaneously with the backing off operation just described, the starting switch K will be closed as a result of the pawl 572 dropping off the end of the cam 578, thus starting the operation of the work revolving mechanism and the welding heads, and clutching the limit switch control cam to the shaft 48 for revolution therewith during the welding operation. The starting of the motor 46 is slightly delayed until the arc voltage has been built up to a proper level for welding.

The welding operation then proceeds until the work has revolved slightly more than a revolution, whereupon the cam 640 of the limit switch L will move the roller 638 to the right as viewed in Fig. 7, opening the limit switch. This causes the immediate stopping of the work revolving mechanism, and the extinguishing of the welding arc slightly thereafter.

The welding operation having been fully completed, the operator now returns the manual control switch to its starting position. This movement returns both of the valves 450, 448 to their initial positions wherein fluid is delivered to the opposite ends of their respective cylinders so as to release the jaws of the chuck, and to move the ram back to its starting position. The same movement of the manual control lever reverses the valve 476 so as to deliver air to the opposite end of the cylinder 416 of the shield mechanism, raising the guard to its inoperative position shown in full lines.

During the return stroke of the ram, the starting switch K is opened, breaking the circuit to the clutch control solenoid 660, declutching the limit switch operating cam, and allowing the cam to return to its starting position.

The work may then be removed from the machine, and new parts inserted preparatory to the commencement of the next cycle of operation, which proceeds in identically the same manner as the cycle just described.

I claim:

1. In a combined assembling press and welding machine, means to support a shaft, means to press a fitting into a press fit connection with an end of the shaft, and means, initiated by the pressing mechanism at the completion of the pressing operation for welding the fitting to the shaft.

2. In a combined assembling press and welding machine, means to support a shaft, means to press a fitting into a press fit connection with an end of the shaft, means, initiated by the pressing means for rotating the shaft and fitting, and means for welding the fitting to the shaft during such rotation.

3. In a combined assembling press and welding machine, means to support a shaft, means to press a fitting into telescoping connection with an end of said shaft, and separate means automatically initiated at the completion of the pressing operation for respectively rotating the shaft and fitting and for welding the telescoping portions of the fitting and the shaft during such rotation.

4. In a combined assembling press and welding machine, means to support a shaft, means to press a fitting into telescoping connection with an end of said shaft, and separate means, automatically initiated at the completion of the pressing operation, for first releasing the pressure from said fitting, for rotating the shaft and fittings, and for welding the telescoping portions of the fittings and shaft during such rotation.

5. In a combined assembling press and welding machine, means to support a shaft, a ram mounted for sliding movement in a direction parallel to said shaft, adapted to rotatably support in alignment with said shaft, a fitting formed for telescoping connection with an end of said shaft, means for applying pressure to the ram for effecting such telescoping connection, means automatically initiated at the end of the pressing operation to first back off the ram slightly so as to allow the fitting to rotate freely with relation to the ram, and to then rotate the shaft and fitting, and means for welding the fitting to the shaft during such rotation.

6. In a combined assembling press and welding machine, a slidable ram adapted to support a fitting formed for a press-fit connection with another member, hydraulic means for applying pressure to the ram for effecting said connection, means for backing off the ram against the pressure of said hydraulic means at the end of the pressing operation so as to release the pressure on the fitting and allow the same to rotate freely relative to the ram, means initiated at the completion of the pressing operation for rotating the fitting and said member, and means for welding said fitting to said member during such rotation.

7. In a combined assembling press and welding machine, means adapted to rotatably support a fitting formed for a press fit connection with an end of a shaft, and to apply pressure to the fitting for effecting such connection, quick acting fluid pressure operated means to relieve such pressure at the end of the pressing operation so as to allow the fitting to freely rotate with respect to the ram, means initiated at the end of the pressing operation for rotating said shaft and fitting, and means for welding the fitting to the shaft during such rotation.

8. In a combined assembling press and welding machine, means adapted to rotatably support a fitting formed for a press fit connection with an end of a shaft, and to apply pressure to the fitting for effecting such connection, means to relieve such pressure at the end of the pressing operation so as to allow the fitting to freely rotate, means initiated at the end of the pressing operation for rotating said shaft and fitting, and means for welding the fitting to the shaft during such rotation, said pressure relieving means comprising a rotatable cam engageable with a forward face of the pressure applying means, a quick acting fluid motor for rotating said cam, a source of fluid under pressure, and a valve, opened at the end of the forward stroke of the pressure applying means, for admitting said fluid under pressure to said fluid motor.

9. A combined assembling press and welding machine as defined in claim 7, wherein said pressure relieving means comprises a quick-acting fluid motor, a source of fluid under pressure, a valve adapted when open to admit fluid from said source to said motor, a spring-powered valve operating element adapted to be moved by the pressure applying means during the return stroke of the latter, to an energized position, and a trigger for setting said element in said energized position, said trigger being adapted to be tripped by the pressure applying means at the end of the forward stroke of the latter.

10. In a combined assembling press and welding machine, a frame, means to support a tubular shaft for rotation, and means for supporting in alignment with and pressing into the end of said shaft, a stub end adapted to have a press fit telescoping connection therewith, said last means comprising a ram mounted in the frame for sliding movement parallel to the axis of said shaft, said ram including a cylinder having a bore coaxial with the shaft, a shell rotatable in said bore and in axial thrust receiving association with said cylinder, said shell having in its forward region piloting means for receiving said stub end, and in its rear region, pressure transmitting means against which the rear end of said stub end may abut, means for drivingly engaging said rear end of said stub end and means for rotating said shell so as to cause said stub end and shaft to rotate at the completion of the pressing operation, said last means comprising a transmission shaft parallel to the axis of rotation, and gearing forming a drive connection between said transmission shaft and said shell, said gearing being carried by the ram and having a slidable driving connection with said transmission shaft.

11. A combined assembling press and welding machine as defined in claim 10, wherein the means against which said stub end abuts is provided with a conductor projecting through the rear end of the shell, and including a brush cooperating with the projecting end of said conductor for transmitting welding current to said stub end.

12. In a combined assembling press and welding machine, means to support a shaft, rotatable devices for supporting and locating in axial alignment with and adjacent the respective ends of said shaft, a pair of fittings adapted each to have a press-fit connection with a respective end of said shaft, means to apply pressure against one of said devices so as to assemble both of said fittings on the shaft, means to individually rotate, in unison with each other, each of said devices so as to rotate the fittings and the shaft with a minimum of torque transmission therebetween, and means for welding said fittings to the shaft during such rotation.

13. In a combined assembling press and welding machine, means to effect a press-fit connection between the end of a shaft and a fitting, means for rotating the shaft and fitting after the completion of such connection, means for welding the fitting to the shaft during such rotation, and a starting switch, actuated by the pressing means at the end of the pressing operation, for simultaneously energizing both said rotating means and said welding means.

14. In a combined assembling press and welding machine, a frame, including means for supporting a shaft, a pressing ram slidably mounted in the frame and adapted to rotatably support a fitting formed for a press-fit connection with an end of said shaft, means including an electric motor for rotating the shaft and fitting, means for welding the fitting to the shaft during such rotation, a starting switch mounted on the frame, adapted to simultaneously energize both said motor and said welding means, said starting switch including an operating lever, and a switch actuator carried by the ram and coacting with said lever so as to close said switch at the end of the forward stroke of the ram.

15. In a combined assembling press and welding machine, means to support a shaft, means to press a fitting into telescoping connection with an end of said shaft, means including an electric motor for rotating the shaft and fitting, electric welding means for welding the fitting to the shaft during such rotation, a starting switch actuated by the pressing means at the end of the pressing operation for simultaneously energizing said motor and said welding means, and means controlled by said rotating means at the end of a predetermined amount of rotation thereof, for breaking the circuit of said motor.

16. In a combined assembling press and welding machine, means to support a shaft, means to press a fitting into telescoping connection with an end of said shaft, means for rotating the fitting and the shaft, including an electric motor and a power transmitting shaft driven by said motor, electric welding means for welding the fitting to the shaft during such rotation, a starting switch, actuated by the pressing means at the end of the pressing operation for energizing both said motor and said welding means, a limit switch in series with said starting switch, normally closed, and a switch actuator carried by said transmitting shaft and adapted to open said limit switch at the end of a predetermined amount of rotation of said shaft so as to deenergize said motor.

17. A combined welding and assembling press as defined in claim 16, wherein said actuator is rotatably mounted on said shaft, a clutch for connecting said actuator to the shaft, a solenoid for operating said clutch, said solenoid being energized at all times when the starting switch is closed and means whereby said starting switch is closed at the end of the forward stroke of the pressing means and is opened after said pressing means has partially returned to its starting position.

18. A combined assembling press and welding machine as defined in claim 16, wherein said actuator is rotatably mounted on said transmission shaft, a clutch for connecting said actuator to the shaft, a solenoid for operating said clutch, weight means for swinging said actuator to a starting position when released by the clutch, and a latch for determining said starting position.

19. In a combined assembling press and welding machine, means to support a shaft, means to separately support a pair of fittings in axially aligned relationship adjacent the ends of the shaft, means for pressing the fittings into the respective ends of the shaft while thus supported, means for separately synchronously rotating said fitting supporting means so as to rotate the assembled fittings and shaft with a minimum of transmission of torque therebetween, and means for welding the fittings to the shaft while thus rotating.

20. A machine as defined in claim 19, including means for relieving the pressure on the fittings at the end of the pressing operation.

21. In an assembling press, means to rotatably support two elements adapted for a press fit connection with each other, and to apply pressure to one of said elements for effecting such connection, means to relieve such pressure at the end of the pressing operation so as to allow said elements to rotate freely for the purpose of a subsequent operation, said pressure relieving means comprising a rotatable cam engageable with a forward face of the pressure applying means, a quick-acting fluid motor for rotating said cam, a source of fluid under pressure, and a valve, opened at the end of the forward stroke of the pressure applying means, for admitting said fluid under pressure to said fluid motor.

22. An assembling press as defined in claim 21, including a valve for controlling the flow of fluid to said pressure relieving means, a spring powered valve operating element adapted to be moved by the pressure applying means during the return stroke of the latter, to an energized position, and a trigger for setting said element in said energized position, said trigger being adapted to be tripped by the pressure applying means at the end of the forward stroke of the latter.

23. In a combined assembling press and welding machine, means adapted to rotatably support a fitting formed for a press-fit connection with an end of a shaft, and to apply pressure to the fitting for effecting such connection, means to relieve such pressure at the end of a pressing operation so as to allow the fitting to freely rotate, said means including a quick-acting fluid motor and force-multiplying means for transferring pressure from said motor to a forward face of the pressure applying means, means initiated at the end of the pressing operation for rotating said shaft and fitting, and means for welding the fitting to the shaft during such rotation.

24. In a combined assembling press and welding machine, means to effect a press fit connection between the end of a shaft and a fitting, mechanisms cooperating to effect a weld between said shaft and fitting, one of said mechanisms comprising means for rotating the shaft and fitting and the other of said mechanisms comprising means for welding the fitting to the shaft during such rotation, and a starting switch, actuated by the pressing means at the end of the pressing operation, for energizing at least one of said mechanisms.

25. In a combined assembling press and welding machine, means to effect a press fit connection between the end of a shaft and a fitting, means including an electric motor for rotating the shaft and fitting, means for welding the fitting to the shaft during such rotation, a starting switch actuated by the pressing means at the end of the pressing operating for energizing said motor, and means controlled by said rotating means at the end of a predetermined amount of rotation thereof, for breaking the circuit of said motor.

26. In a welding machine, means to support for rotation a pair of elements to be welded together, an electric motor for rotating said elements, means for welding said elements together during such rotation, an electric circuit for energizing said motor, said circuit including a normally closed limit switch, a rotatable member driven by said motor, a switch actuator having a circumferentially adjustable driving connection with said rotatable member, adapted to open said limit switch at the end of a predetermined amount of rotation of said elements and to thereby deenergize said motor, and means for automatically adjusting said actuator to a determined starting position when said circuit is opened.

27. A welding machine as defined in the preceding claim, wherein said automatic adjusting means is gravity-controlled.

28. In a welding machine, means to support for rotation a pair of elements to be welded together, an electric motor for rotating said elements, means for welding said elements together during such rotation, an electric circuit for energizing said motor, said circuit including a limit switch adapted when actuated to open said circuit and deenergize said motor, a shaft driven by said motor, a switch actuator rotatably mounted on said shaft, an electromagnetic clutch adapted when energized to connect said actuator in driving relationship with said shaft whereby at the end of a predetermined amount of rotation of said elements said actuator will actuate said limit switch to deenergize the motor, said electromagnetic clutch being energized by said circuit and deenergized by the opening thereof, means independent of said limit switch for establishing said circuit, and gravity-controlled means for moving said actuator to a determined starting position when released by said clutch.

GEORGE G. CARLSON.